Figures 1, 2:
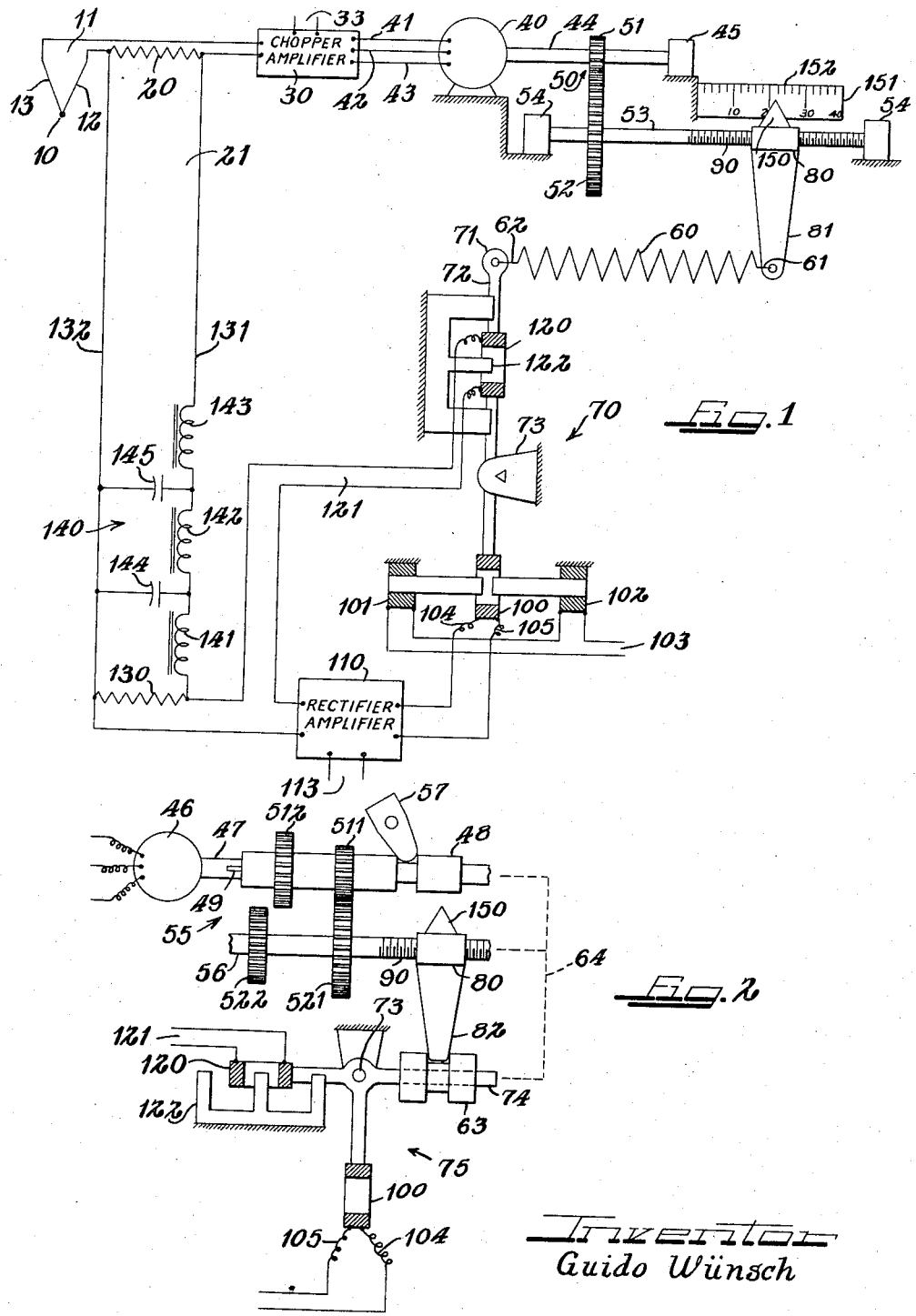

March 17, 1959 — G. WÜNSCH — 2,878,449
MEASURING APPARATUS, MAINLY FOR THERMO-ELECTRIC MEASUREMENTS
Filed June 28, 1955

Inventor
Guido Wünsch
F. D. Prager
Atty.

United States Patent Office 2,878,449
Patented Mar. 17, 1959

2,878,449

MEASURING APPARATUS, MAINLY FOR THERMO-ELECTRIC MEASUREMENTS

Guido Wünsch, Berlin-Wannsee, Germany, assignor to Askania-Werke A. G., Berlin-Friedenau, Germany, a corporation of Germany Application June 28, 1955, Serial No. 518,570

Claims priority, application Germany July 3, 1954

6 Claims. (Cl. 324—99)

This invention relates to measuring apparatus, mainly for measuring small direct-current voltages such as those produced by thermocouples. The invention relates particularly to apparatus wherein the test voltage, for instance the thermocouple voltage, is compensated by a countervoltage generated for this purpose and the measuring indicator or recorder moves in response to the generation of countervoltage, compensating voltage, or compensated voltage.

Heretofore the accuracy of such apparatus was dependent on two complicating and cost-producing factors: uniformity of countervoltage generation and accuracy of countervoltage application. It is an important object of this invention to improve apparatus of the present type in these respects.

A particular object is to provide such apparatus which requires no standard cell or the like.

Another particular object is to provide such apparatus which operates without the use of any potentiometer counterconnected to the test voltage.

A further object is to provide such apparatus having unusually high precision, at low cost.

Still another object is to provide such apparatus having predetermined buildup time for self-compensation; for instance a predetermined number of fractional seconds.

The objects have been achieved by an electro-mechanical combination, the mechanical part of which is a motorized current balance or amperage weigher. This balance yields the compensating countervoltage within a time interval which can be kept at any predetermined magnitude, such as a few cycles of the current controlling the motorized balance, and with an accuracy which compares most favorably with that attainable by more expensive systems previously used for the present purpose. The details will be understood from the description of preferred embodiments, which follows.

In the drawing, which is purely diagrammatic, Figure 1 is a schematic view of a first embodiment of this invention and Figure 2 is a partial, schematic view of a second embodiment. The first embodiment will now be described.

The thermocouple 10 is shown as an element producing a small, variable, direct-current (D. C.) test voltage. The test voltage is applied to the indicating and/or recording device by an input circuit or measuring circuit 11, comprising a pair of thermocouple conductors 12, 13. Interposed on conductor 12 there is a resistor 20, connected with a compensating circuit 21 to form a so-called differential circuit 11, 21 and thereby to produce a compensated thermocouple voltage. This latter voltage is converted into an alternating power current voltage, in known manner, by a chopper-amplifier 30 having the input thereof in measuring circuit 11. The power current voltage furnished by the output of said amplifier is fed into a reversible A. C. servomotor 40, by conductors 41, 42, 43.

In one of the best forms of apparatus for present purposes, heretofore available, a servomotor similarly controlled was employed to shift a potentiometer connected with a standard cell or the like, to derive a compensating voltage. The standard cell apparatus tended to be expensive, yet unreliable and the potentiometer apparatus tended to be cumbersome, yet limited in accuracy because of unavoidable problems such as corrosion and wear in sliding contacts.

According to the invention, a new control system is provided wherein the motor 40 rotates a drive 50, shown as comprising a pinion 51 which is fast on the motor shaft 44 and also comprising a gear 52 which is fast on an indicator and current balance control spindle 53. The shaft 44 and spindle 53 rotate in bearings 45, 54 respectively. The spindle serves directly to vary the tension of a tension spring 60 and thereby to influence the position of a current balance or electromechanical balance 70; an element known by itself. In order to control the spring there is provided an interiorly threaded sleeve 80, engaging an exteriorly threaded portion 90 of the spindle 53. A dog 81 is secured to the sleeve 80 and holds one end 61 of the spring 60, while the other end 62 of the spring engages a connector 71 forming part of the balance lever 72 of the current balance. The lever 72 is pivoted by a suitable knife edge or the like, indicated at 73. The lever carries an element of a compensating current generator. As shown, this generator element can be a small and light electromagnetic coil 100 rigidly secured to one arm of the lever 72. Such a coil can furnish an electric current for the balance itself and for the compensation of the test voltage, with a minimum buildup delay and without any pneumatic time lag and the like. For instance, the coil 100 can be inductively coupled with a pair of stationary electromagnets 101, 102, coaxially opposed to the two ends of the coil. The electromagnets may be connected directly to a suitable A. C. source 103.

The current induced in the coil 100 is rectified and amplified by a rectifier-amplifier 110 the input of which is connected with the coil by a pair of flexible conductors 104, 105. The output of the rectifier-amplifier 110 provides power for a power element or plunger coil 120 of the current balance, by a balancing circuit 121. Under the influence of this circuit the coil 120—secured to a second arm of the lever 72—can oscillate in the field of a permanent magnet 122, so as to variously counteract the pull applied to the lever 72 by the spring 60.

The balancing circuit 121 includes a resistor or voltage divider 130 in series with the coil 120; and the aforementioned test voltage compensating circuit 21 is branched off from the balancing circuit 121 across this resistor 130. For this purpose a pair of conductors 131, 132 interconnect corresponding terminals of resistors 130 and 20. Voltage ripples occurring in the balancing circuit 121 are smoothened out in the compensating branch circuit 21 by incorporating a filtering direct current portion 140 in the latter; for instance as shown, this latter portion includes reactor input filter means comprising a series of reactors 141, 142, 143 on conductor 131 and capacitors 144, 145 between conductors 131, 132. In this manner a power circuit 121, 140 is connected with the compensating circuit 21, by means of which a smooth, compensating voltage is applied across the differential resistor 20. The magnitude range of the compensating voltage is determined by the selection of resistor and filter elements 130, 140, aside from the gain factor of the rectifier-amplifier 110.

The power supplies 33, 113 of the two amplifiers 30, 110 can be connected to the same A. C. source which feeds the current balance power supply 103. It will be noted that no standard cell or other battery is used in the system as shown.

In operation, so long as the temperature of the thermocouple 10 remains constant, there is a constant test voltage in the input circuit 11, resulting, as will be seen, in a constant compensating voltage in the compensating circuit 21 and a zero differential or compensated voltage on the input of the chopper-amplifier 30. Motor 40 is at rest. The sleeve 80 is in some position along the spindle 53. This position, and thereby the temperature prevailing at 10, can be indicated by a pointer 150 rigid with the sleeve 80 and cooperating with a stationary scale 151. Thus the parts 40, 50, 60 and 70 constitute a mechanical unit, electrically controlled at 10, 30, electrically self-balancing by parts 100, 110, 120, 130 and 20 and including an indicator device 50, 60. The unit will balance itself in any one of an infinite number of positions. For instance, the sleeve 80 and pointer 150 may be at rest at some point in the right-hand part of the scale 151. The tension of the spring 60 is then at a certain value; the balance lever 72 is in a certain position, with coil 120 at right and coil 100 at left of central—not necessarily normal—positions. As a result, an A. C. of certain phase and magnitude is induced in coil 100. This current, rectified and amplified, flows in coil 120, whereby the lever 72 is attracted to or repulsed from the magnet 121 with a certain force; and such force, on proper adjustment of compensator-generator 100, 101, 102 and amplifier 110, balances the lever 72 against the pull of spring 60. The rectified and amplified current from 110 flows also in resistor 130, thereby impressing a compensating voltage on the differential resistor 20. This compensating voltage, as mentioned, can be adjusted by proper tapping of resistor 130, so that it will cancel the test voltage from element 10 under the balanced conditions here described.

Assuming now that the temperature at 10 increases for a short period of time and to a small extent, this produces a small D. C. input of a certain direction for the chopper-amplifier, over a short period of time. Since any desired amplification can be used this input increment signal can be detected practically at once; and it promptly causes a corresponding A.-C. output of chopper-amplifier 30, through a certain pair of conductors, say 41, 42. This starts motor 40 in a certain rotary sense, so as to shift the sleeve 80 in a certain direction, say further to the right. This modifies (increases) the tension of the spring 60, thereby resiliently shifting coil 120 more to the right and coil 100 more to the left. As soon as such resilient shifting begins it causes practically instantaneous changes (increases) in the input and output currents of the rectifier-amplifier 110. A changing compensating current results, which flows in coil 120 and promptly begins to resiliently rebalance the lever 72; and the corresponding change in compensating circuit 21 promptly begins to rebalance the differential circuit 11, 21. The motor 40 continues to operate, so long as the temperature and test voltage continue to change at 10. The motor stops promptly when the change of compensating voltage has been completed. At such time the change of balancing current has been completed also and the current balance and indicator unit is at rest again, indicating the new temperature at 150.

Either positive or negative increments of temperature at 10 will so produce corresponding, prompt and accurate responses at 20 and 120; it is believed to be unnecessary to describe this operation further. It may be well, however, to explain the avoidance of a time lag further. The only basically inert portion of the present system is the motorized mechanism 40, 50, 60, 70, which requires a few initial cycles of output current from chopper-amplifier 30 to accelerate or decelerate its mass. The mass in question can be kept very small, since the motor 40 only serves to shift an indicator and/or recorder element 150 and light parts auxiliary thereto. Therefore the actuation and balancing of the mechanism can be performed smoothly and without hunting, within a short interval, although a resilient—impulse energy storing—link 60 is used for this purpose. The time constants of the system are a function mainly of the masses of spring 60 and balance 70. It is possible so to select such masses as to complete the balancing of the lever 72 within less than .5 second, or if desired within less than .1 second, even upon the arrival of an impulse at 10 having high magnitude, rate of change and duration. A minimum of about five or six cycles of the usual A. C. power current supply are utilized to start and move the mechanism.

In many applications such as temperature reading the original impulses at 10 are not particularly frequent but minimum impulses may be extremely small. In order to insure a positive motor response even upon an extremely small impulse—not only after slow summation of several successive and cumulative impulses—it may be desirable to make the mass of the balance 70 greater than it is in other cases. For this purpose it is possible, for instance, to add inert weight to the balance. It is preferable, however, to avoid such additions. I therefore prefer in such cases, and also in certain other applications, to replace the spring 60 by a weight shiftable on a lever arm of the balance under the control of the mechanism 40, 50, 80, as indicated in Figure 2 at 63. As suggested by Figure 2 at 64 it is even possible in some cases to mount the entire servomotor 46 and drive 55 on the surrent balance lever 74. The connection 82 between the sleeve 80 and weight 63 can then be rigid, eliminating all backlash.

Figure 2 also shows a modified drive 55 between the servomotor 46 and the balance-indicator system 75, 150. The motor shaft 47 is here shown as having a sleeve 48 slidably mounted thereon and held against rotation of its own by a slot and key device 49. A pair of pinions 511, 512 of different size are fast on the sleeve 48 and a pair of gears 521, 522, are fast on the spindle 56 supporting the indicator sleeve 80, so that either gears 511, 521 or gears 512, 522 can be shifted into meshing position, by a control 57, thereby varying the proportion of response at 150 to the unit impulse increment from 10. For instance, the drive 55 can be manually or automatically shifted into high gear for a high temperature range and into low gear for a low temperature range. The pointer 150 can serve as pen or pencil of a recorder, operating on any suitable chart (not shown).

The accuracy of the present balancing system can be made very high, without great cost, regardless whether the desired rate of response is extremely rapid (Figure 1) or moderate (Figure 2). The accuracy of response depends mainly on the control and linkage of magnetic flux at 100, which can be made very precise and also very insensitive to wear and tear, at minimum expense. Very small temperature fluctuations can be measured by this system; for instance it is possible to limit the residual error to less than one-thousandth of the value measured, within a wide measuring range.

Various modifications are possible. I claim:

1. In apparatus for measuring a small direct current voltage such as that generated by a thermocouple, a control system comprising: a measuring circuit adapted to generate said voltage; an amplifier having the input thereof in said circuit; an electric motor driven by the output of said amplifier; a resistor in said measuring circuit; a compensating circuit connected to said measuring circuit across said resistor to compensate said small voltage; a power circuit including a voltage divider and a direct current circuit portion connected across said voltage divider to said compensating circuit to drive the latter, said power circuit also including a generator element for providing power voltage and a power element operable by such power voltage; an electromechanical balance having said generator element on one arm thereof to control said providing of power voltage and driving of the compensating circuit, the balance having said power element on another arm thereof to apply a primary force to the balance; and an indicator device moved by said motor to apply to said balance a secondary force counteracting said primary force and proportional to the position to which the motor is driven by the amplifier, in response to said small direct current voltage, and thereby to indicate said voltage.

2. Apparatus as described in claim 1 wherein said generator element is adapted to provide a small alternating power voltage and said power circuit includes rectifier-amplifier means with an input connected to the generator element and an output connected to the direct current circuit portion, the power element and the voltage divider.

3. Apparatus as described in claim 1 wherein the indicator unit comprises a mechanical element movable by and with the motor drive; a lever arm forming part of the balance; and a spring, controlled by said mechanical element, for resiliently moving the lever arm.

4. Apparatus as described in claim 1, wherein the indicator unit comprises a mechanical element movable by and with the motor; a lever arm forming part of the balance; and a weight movable by the mechanical element, along the lever arm, for variously weighting the arm.

5. Apparatus as described in claim 1 wherein said power element comprises an electric circuit element rigid with the balance.

6. Apparatus as described in claim 1 comprising a variable, high and low gear connection between the said motor and said balance.

References Cited in the file of this patent

UNITED STATES PATENTS

| | | |
|---|---|---|
| Re. 23,850 | Roper | July 13, 1954 |
| 1,729,320 | Anderson | Sept. 24, 1929 |
| 2,720,620 | Power | Oct. 11, 1955 |